May 14, 1963 — P. L. MICHAEL ETAL — 3,089,561
INDUSTRIAL NOISE HAZARD METER
Filed Jan. 20, 1959 — 4 Sheets-Sheet 1
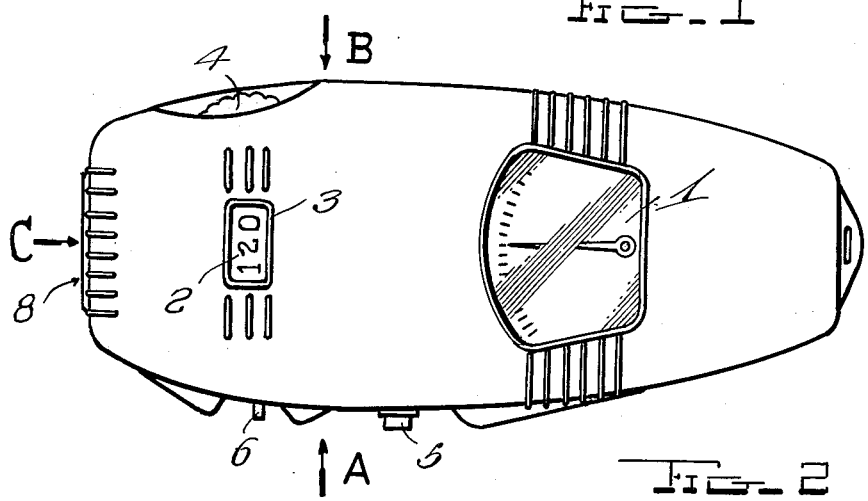
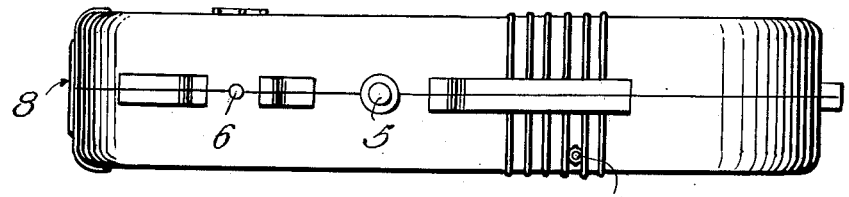
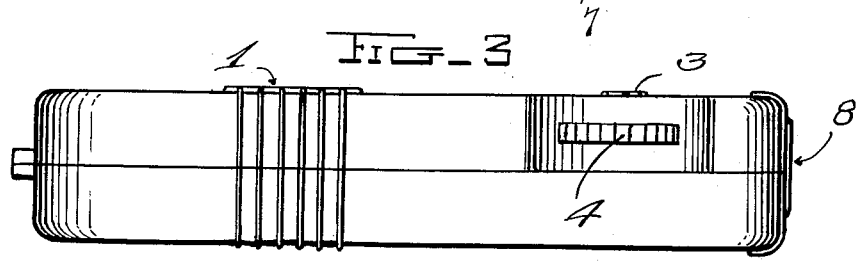
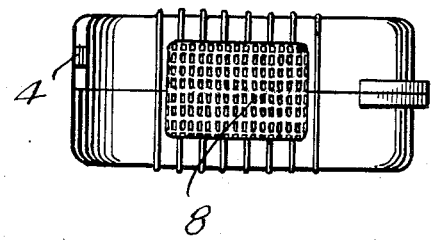
INVENTORS
PAUL LEE MICHAEL
JOHN PHILLIP STRANGE
KENNETH CARR STEWART
BY John B. Brady
ATTORNEY

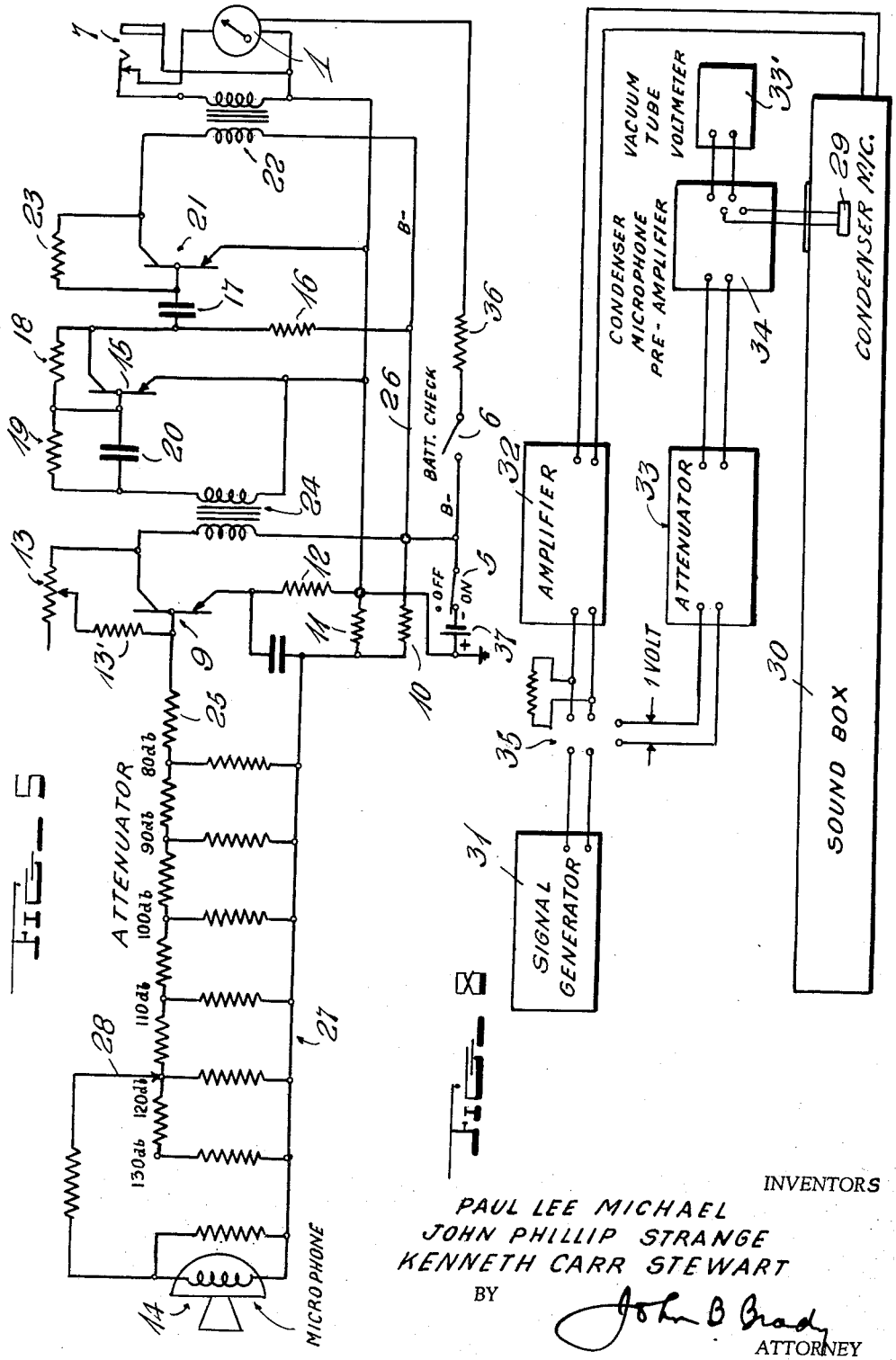

May 14, 1963 P. L. MICHAEL ETAL 3,089,561
INDUSTRIAL NOISE HAZARD METER
Filed Jan. 20, 1959 4 Sheets-Sheet 3
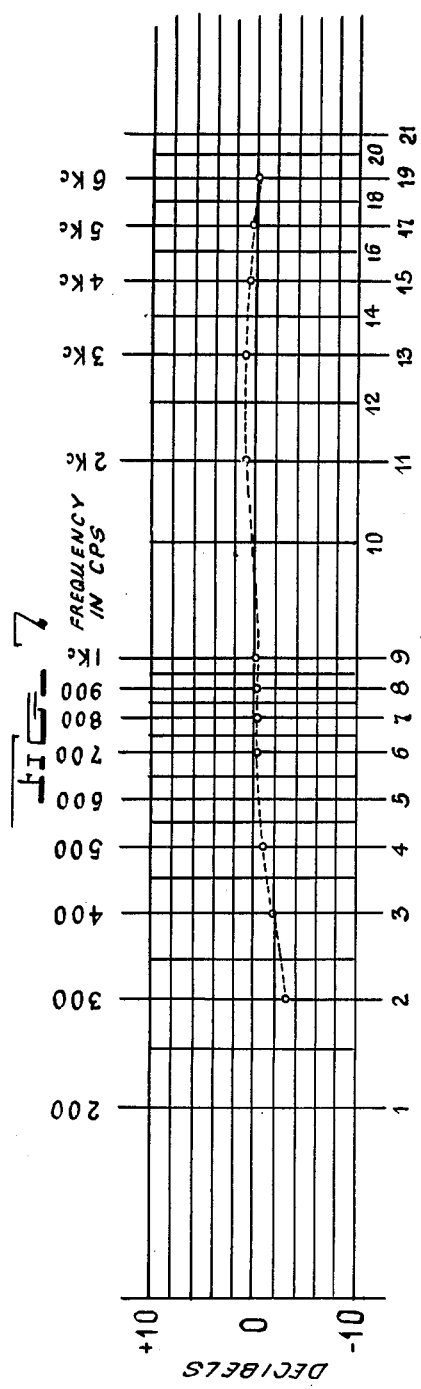
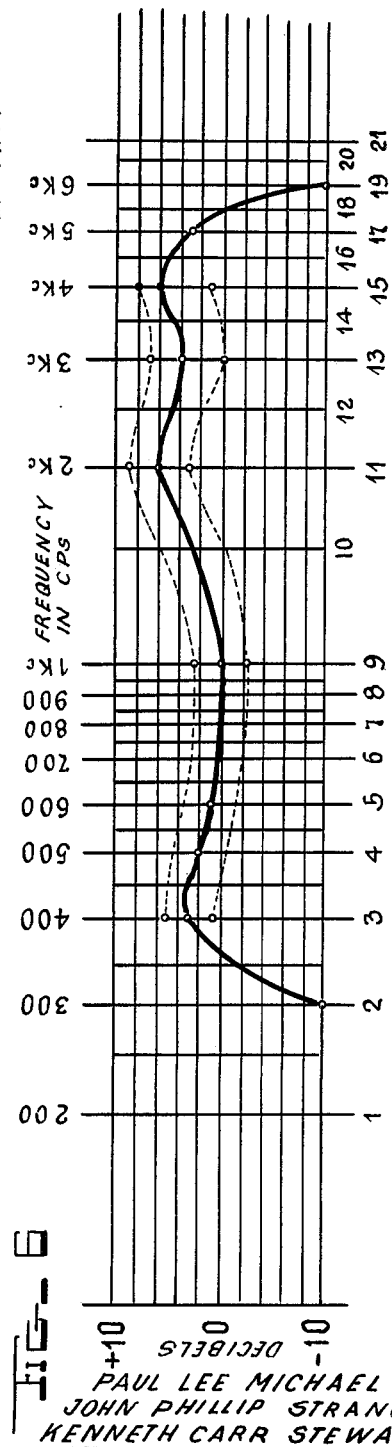
INVENTORS
PAUL LEE MICHAEL
JOHN PHILLIP STRANGE
KENNETH CARR STEWART
BY
John B. Brady
ATTORNEY

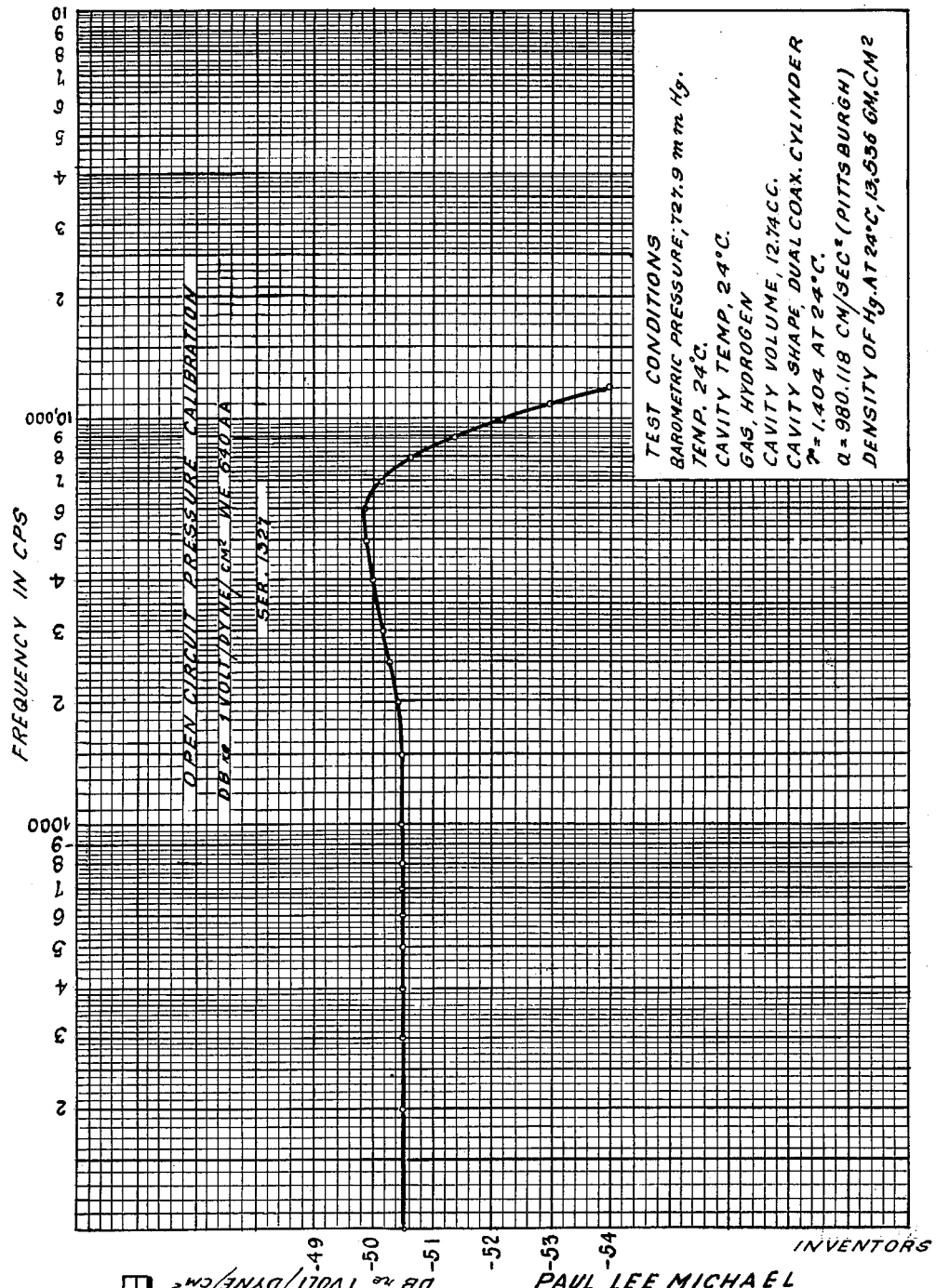

United States Patent Office 3,089,561
Patented May 14, 1963

3,089,561
INDUSTRIAL NOISE HAZARD METER
Paul Lee Michael, Forest Hills, John Phillip Strange, Murrysville, and Kenneth Carr Stewart, Bridgeville, Pa., assignors to Mine Safety Appliances Company, Pittsburgh, Pa., a corporation of Pennsylvania
Filed Jan. 20, 1959, Ser. No. 787,844
4 Claims. (Cl. 181—.5)

Our invention relates broadly to electrical instruments for measuring noise intensity levels and more particularly to a portable, battery powered, noise hazard meter which gives a direct indication of potential danger to human hearing.

Noise in various forms is now considered a problem in virtually every industry in the United States. It is not a new problem but it is one which is rapidly growing with increased power consumption. The seriousness of noise complaints vary from minor disturbances to instances where permanent hearing damage is incurred. Industry is particularly concerned about those areas where the worker's hearing is being threatened.

To determine the extent of a noise hazard many variables must be considered. Two of the most important of these variables are sound pressure level and frequency distribution of the noise. In the past it has been necessary to use bulky and complex electronic analyzing equipment to get these data. After the complex instruments are used it is still necessary to compare the data with a hearing loss criterion to determine the extent of the noise hazard.

One of the objects of our invention is to provide a compact portable instrument for measuring noise hazard capable of being held and operated by one hand in the noise field while making an observation.

Another object of our invention is to provide a noise hazard measuring instrument whose meter gives a direct indication of the damage risk to human hearing.

Another object of our invention is to provide a battery powered noise hazard meter having its own battery checking circuit.

Still another object of our invention is to provide a noise hazard meter of simple and inexpensive construction capable of being operated by non-technical personnel.

A further object of our invention is to provide a noise hazard meter employing a microphone which has been frequency weighted with respect to damage risk criterion thus eliminating the necessity of using hearing loss criterion conversion tables.

Still a further object of our invention is to provide a noise hazard meter which can also be used as a preamplifier in conjunction with other noise measuring equipment.

Other and further objects of our invention reside in the circuit switching arrangement for a noise meter as set forth more fully in the specification hereinafter following by reference to the accompanying drawings, in which:

FIG. 1 is a top plan view of the noise hazard meter of our invention;

FIG. 2 is a side elevational view of the noise hazard meter looking in the direction of arrow A;

FIG. 3 is a side elevational view of the noise hazard meter looking in the direction of arrow B;

FIG. 4 is an end elevational view of the noise hazard meter of our invention looking in the direction of arrow C and particularly showing the microphone cover grille;

FIG. 5 is a schematic electrical wiring diagram of the electrical circuit of the noise hazard meter of our invention;

FIG. 6 is a frequency response curve for the microphone of the noise hazard meter of our invention showing noise in decibels compared with frequency and particularly showing in dotted lines the overall tolerance limits of the microphone;

FIG. 7 is an electrical response curve of frequency compared with noise in decibels for the amplifier circuit of the noise hazard meter of our invention;

FIG. 8 is a block diagram showing the equipment and method of acoustically calibrating the noise hazard meter of our invention; and FIG. 9 is a calibration curve of a standard condenser microphone showing the output on the ordinates plotted in db below one volt per dyne/cm.$^2$ compared with frequency in c.p.s. shown on the abscissa.

Our invention is directed to a noise hazard meter which will provide a single reading which describes the noise hazard of the working environment directly by measuring the noise through a microphone such as that disclosed in Patent No. 2,400,281, issued to L. J. Anderson on May, 14, 1946, which has been frequency weighted with respect to a damage risk criterion. This instrument is small, portable, battery-powered, and is housed in a small case similar to that of an electric shaver.

In operation the microphone transforms acoustical energy to electrical energy and delivers the electrical signal to a calibrated amplifier and attenuation network. The signal is then measured by a meter or recording system. Because the microphone transforms some frequency components of the acoutical signal with more efficiency than others (according to damage risk criteria), since the microphone such as that disclosed in Patent No. 2,400,281 is designed to have a relatively flat response to approximately 1000 c.p.s. and a rising response to approximately 5000 c.p.s., the measured signal will be closely correlated with damage risk to human hearing.

Various modifications and uses of this device are possible which will not depart from the scope of this description. For example, it can be used as a pre-amplifier for other noise measuring equipment such as a noise integrator. Other frequency weightings can also be applied to the microphone.

The industrial noise hazard meter of our invention has been designed to measure sound pressure according to (1) a "c" flat frequency response, or (2) a frequency response designed to hearing damage criteria. The frequency response characteristics of a microphone such as disclosed in Patent No. 2,400,281, are a function of the microphone design; therefore, an instrument can be made to respond in the desired manner by the proper selection of microphones.

The "c" flat response gives equal weighting to all audible frequencies within the limits of the microphone used (300 to 5000 c.p.s.). This response will be used for many physical sound measurements such as those taken in noise reduction and architectural acoustics.

Microphones such as that disclosed in Patent No. 2,400,281, issued to L. J. Anderson, on May 14, 1946, with the frequency response tailored to human hearing damage criteria have been designed to pass those frequencies that are more dangerous physiologically with more efficiency than others. In a "semi-steady" noise, a single reading taken with a noise hazard meter equipped with a weighted microphone will indicate the potential danger of hearing loss. Previously, in this same environment, it has been necessary to take measurements with a sound analyzer and then compare the data obtained with damage risk criteria to determine the potential of a noise hazard.

Referring to the drawings in more detail, in FIG. 1 we have shown a top plan view of our industrial noise hazard meter. The meter 1 indicates sound pressure level in decibels (db) (re .0002 microbar) and also has a scale with a battery check position. The attenuator setting is indicated by a dial reading at 2 through the opening 3 in the case directly above the meter and is changed by attenuator control wheel 4. To prolong battery life a push button type power switch 5 was selected to energize the instrument. The small push button switch 6 in front of the power switch 5 is the battery check switch. The battery port is located on the underside of the instrument directly opposite the attenuator control 4. The small jack 7 to the left of the meter is an output connection for purposes of attaching an external indicator. This is intended primarily for use with other noise measuring instruments such as the noise integrator instrument. The microphone is located at the end covered by the metal grill 8.

The noise hazard meter has been designed so that it can be operated with one hand. If held in the right hand, the thumb is used to adjust the attenuator control 4 while the middle finger is used for operating the power switch 5. The power switch 5 must be depressed constantly during operation.

To make a measurement, the instrument is pointed toward the source of the noise to be measured; the power switch button 5 is depressed and the attenuator control 4 is adjusted until the meter reads on scale. The sound pressure level is the sum of the attenuator dial setting shown at 2 plus the meter reading. The operating range is from 80 to 140 db (re .0002 microbar).

For a battery check both the power switch 5 and the battery check switch 6 must be depressed simultaneously. The total current drain of this instrument is approximately 5–6 ma. and with this drain the battery life on a two-cell mercury battery for example should be at least 45 hours.

The microphone design with the frequency characteristics is based on hearing damage criteria. Ideally, this microphone has a frequency response curve which is flat from 300 to 1000 c.p.s. and has a rising characteristic to 5000 c.p.s. as shown in FIG. 6. Below 300 c.p.s. and above 5000 c.p.s. the response falls off rapidly (20 db/octave). This microphone is designed to operate in the range of 80 to 140 db re .0002 microbar. As mentioned earlier the microphone can also be designed to measure sound pressure according to a "c" flat frequency response.

In FIG. 5 we have shown the electrical circuit of the industrial noise hazard meter. This circuit uses transistors such as Raytheon transistors 2N133 and 2N131. The transistorized circuit is temperature compensated. With these transistors and a two-cell battery, such as the Mallory TR-152, this amplifier has a maximum power output of approximately 6 milliwatts into a 5000 ohm meter load.

The total current drain of this instrument is approximately 5–6 ma. and the average battery should last approximately 45 hours.

The electrical response of the amplifier is essentially flat from 300 to 8000 c.p.s. as indicated by FIG. 7. The circuit is compensated so that there will be negligible changes in gain and frequency response characteristics from 50° to 90° F. The circuit is also compensated for drift or shifts in transistor characteristics; however, it is necessary to check the calibration if it is necessary to change any of the transistors.

The transistor amplifier consists of three stages. A first stage transistor 9 (2N133) is selected for low noise and high gain characteristics. This stage is stabilized by a network consisting of resistors 10 and 11 and resistor 12 in the emitter circuit of the first transistor 9. This network is designed to have no effect on the A.C. gain characteristics of this first stage. In this circuit the feedback resistors 13 and 13' connected between the collector and base of transistor 9 do not have an effect on the operating point of the stage but they do have a large effect on the stage gain. This design makes it possible to use resistor 13 as a calibration adjustment.

The input attenuation network shown at 27 connected in parallel with microphone 14 is of the ladder type and is designed to have a constant attenuation independent of the setting of the calibration resistor 13. The movable wiper 28 is coupled to and controlled by attenuator control 4 and by manipulation of control 4 the wiper 28 is moved to the desired section of the ladder type attenuation network. The attenuation network we have shown in FIG. 5 consists of six sections, each having a parallel resistance component and a series resistance component, and each section having an attenuation of 10 db. The contact points for the parallel connected sections which selectively make electrical contact with wiper contact 28 are consecutively labeled 80 db, 90 db, 100 db, 110 db, 120 db, and 130 db. It is a number corresponding to these db designations which appears at 2 in FIG. 1. The coil of microphone 14 is substantially connected in parallel with the attenuation network 27.

Particular attention has been given in design so that this network does not change the frequency response of the overall amplifier. In order to realize the desired characteristics from the microphone 14 it must look into essentially pure resistance; however, the input impedance of the transistor is a combination of resistance and capacitance. Therefore, it was necessary to artificially create this situation by adding resistance 25 in series with the transistor input in the minimum attenuation position. The output from the collector of the first stage transistor 9 is transformer coupled as shown at 24 to the input of the second stage transistor 15.

The collector output of the second stage 15 is R.C. coupled as shown at 16 and 17 to the base of third stage transistor 21. It has been found desirable to use a comparatively low impedance load on the second stage to prevent the overloading that might occur if a high impedance matched load were used. Although this R.C. connection does not give as much power gain as transformer coupling would, it does give a higher power output in this stage; and because the overall circuit has ample power gain, the R.C. connector is preferable.

Resistor 18 from the collector to the base of the second stage amplifier 15 establishes the D.C. operating point of this stage since one end thereof is connected to the power lines 26 through resistor 16, and emitter is connected to ground. The current through this resistor should be about 0.5 ma. This connection provides operating point stability as well as inverse feedback. An increase in collector current through resistor 16 causes a voltage drop which produces less bias current through resistor 18, thereby reducing the collector current and partially compensating for the collector current increase.

Resistor 19 connected to the base of the second stage transistor 15 provides a low impedance discharge path for the coupling condenser 20, thereby eliminating the blocking effect that might otherwise occur after the cessation of loud signals.

The output stage 21 is designed to produce a power of 6 milliwatts in 500 ohms when used with a two cell battery and by means of the output transformer 22 connected in the collector output circuit thereof the power is transferred to meter 1 which gives an indication of noise levels in decibels. The meter 1 is connected in parallel with the output of transformer 22. Connection jack 7 is also connected in parallel with the output of transformer 22.

The output stage transistor 21 is selected to have a comparatively low collector-emitter current (with the base open) so that the operating point current may be readily controlled by the resistor 23 since the emitter is connected to ground. Resistor 23 is adjusted to give a nominal collector current of approximately 4 ma. It is returned to the transistor collector instead of being returned directly to B— because this connection affords some degree of operating point stability and provides inverse feedback to give A.C. stability.

The battery checking circuit is operated by depressing both the power switch 5 and battery check switch 6 simultaneously. This effectively puts the meter circuit comprised of a resistor 36 in series with meter 1, in parallel with battery 37, thus giving a battery voltage reading. As seen from FIG. 5 both switches 5 and 6 are in series and it is essential they both be depressed simultaneously to complete the battery check circuit.

Overall Acoustical Calibration

The industrial noise hazard meter should be calibrated at five test frequencies (400, 700 1000, 2000 and 5000 c.p.s.) in a free field by comparison with a standard condenser microphone, in an acoustic calibration box or in an anechoic room.

A simplified calibration procedure is as follows:

(1) Place the standard condenser microphone 29 in the calibration box or anechoic room as designated at 30 in FIG. 8, so that a pure tone sound field may be applied at 90° (grazing) incidence.

(2) Adjust the sound field level until the output voltage of the condenser microphone 29 corresponds to the desired sound pressure level at 1000 c.p.s. The condenser microphone output voltages for the desired test levels at different frequencies have been previously determined very accurately.

(3) Remove the condenser microphone 29 from the unknown field and replace it with the noise hazard meter microphone 14 making sure that its diaphragm is in exactly the same position that the standard microphone diaphragm occupied.

(4) Adjust the calibration control 4 on the noise hazard meter so that it indicates the same level as the calibrated pure tone in the free field.

(5) Repeat the above steps at 400, 700, 2000, and 5000 c.p.s. See FIGURE 6 for acceptable tolerance levels and limits. It may be necessary to readjust the calibration control 4 (step 4) to bring some of the readings within tolerance limits. If it is not possible to bring all test frequencies within tolerance limits the microphone must be discarded.

The complete calibration procedure should be used periodically to check the insert voltage used in the simplified procedure. The standard condenser microphone calibration should be checked frequently to insure its accuracy.

Microphone Calibration

If desired, the sensitivity and frequency response of the microphone may be checked apart from the complete instrument by suspending the microphone in known free field conditions and measuring its voltage output.

(1) Set a 400 c.p.s. test signal by means of signal generator 31 and amplifier 32 at 94 db in the calibration box 30 using the standard condenser microphone 29 (see "Overall" Calibration Section).

(2) Place the noise hazard meter microphone 14 housed in its case and grill in the field so that its diaphragm is in exactly the same location as the condenser microphone diaphragm occupied.

(3) Measure the output voltage from the noise hazard meter microphone 14 with a vacuum tube voltmeter 33' which is loaded with a 1000 ohm resistor.

(4) Repeat above steps for 700, 1000, 2000, and 5000 c.p.s. test signals.

Electrical Calibration

The noise hazard meter circuit, without the microphone 14, may be checked using an electrical source with an output impedance of 1000 ohms. A 600 ohm source, such as the microvolter, can be matched to the 1000 ohm input by an "L" pad (that is, place a 1000 ohm resistor across the source output and 600 ohms in series with one side).

A 1000 c.p.s. input signal at .000651 v. from a 1000 ohm source should produce a range of at least 3 db between 92.5 and 94.5 db by extreme adjustments of the calibration control. The range and instrument sensitivity can be varied by means of the resistor that is in series with the calibration control.

The frequency response characteristics of the electrical circuit are determined at 400, 700, 1000, 2000 and 5000 c.p.s. using the signal source described above. A test frequency of a fixed voltage is fed into the circuit and the noise hazard meter's indication is taken in db. All other test frequencies should produce the same meter reading at the same calibration control setting if the frequency response is flat. Allowance tolerances are ±1 db from 500 to 8000 c.p.s. and —3, 0 db at 400 c.p.s.

The 10 db attenuator steps may be checked by the following steps:

(1) Turn the attenuator control 4 to the 80 db position.

(2) Adjust the signal source output until the noise hazard meter 1 reads full scale (90 db).

(3) Turn the attenuator control 4 to the 90 db position and the meter should read zero (90 db).

(4) Adjust the signal source output until the meter reads full scale (100 db).

(5) Repeat above steps to 140 db.

The allowable tolerance for these 10 db attenuator steps is ±0.3 db.

FIGURE 8 shows a block diagram of the equipment used in the complete acoustical calibration of the noise hazard meter.

The condenser microphone used in this calibration must be carefully calibrated (output vs. frequency) by the reciprocity method before it can be used as a calibration standard. FIGURE 9 shows the calibration curve for a standard condenser microphone. The output (ordinate) of the curve is given in db below 1 volt per dyne/cm.$^2$. One dyne/cm.$^2$ is equivalent to 74 db when the common reference 0.0002 dynes/cm.$^2$ is used. Therefore, a 74 db sound pressure level will cause a voltage output from the condenser microphone equivalent to the voltage shown on the calibration curve for each frequency.

The complete calibration procedure for the noise hazard meter using the standard condenser microphone is as follows:

(1) The output of the signal generator 31 is connected to the condenser microphone circuit 34 through the attenuator 33.

(2) The generator 31 is set at the 1000 c.p.s. test frequency and the signal level is set at one volt at the input to the condenser microphone preamplifier 34.

(3) The attenuation shown on the calibration curve (FIGURE 9) is inserted between the generator 31 and the input to the condenser microphone preamplifier 34. The voltage at the condenser microphone preamplifier 34 output as read by the VTVM 33' now corresponds to the voltage that would be generated by the microphone and preamplifier from a 74 db noise signal.

(4) The signal generator 31 is now switched by switch 35 to the loudspeaker circuit 32 and the sound pressure level in the calibration box 30 is increased until the condenser microphone preamplifier output voltage is equal to the voltage determined to step 3 above for a 74 db signal.

(5) The condenser microphone is removed from the box 30. The sound pressure level in the calibration box is now precisely set at a known level for the test frequency.

(6) The noise hazard meter microphone 14 is placed in the box so that its diaphragm is in the same position that the condenser microphone diagram occupied and the calibration control 4 on the noise hazard meter is adjusted so that the meter 1 reads to the level set (94 db).

(7) Steps 1 through 5 are carried out for each of the other test frequencies shown in FIGURE 6. The levels and tolerances for these frequencies are also shown in this figure. It may be necessary to readjust the calibration control 4 (step 6) to bring some of the readings within tolerance limits. If it is not possible to bring all test frequencies within tolerance limits, the microphone 14 must be discarded.

We have constructed and tested the industrial noise hazard meter of our invention and have found it very accurate and reliable in comparison with previously used methods of determining hazard of noise to human hearing. We have also found that taking noise measurements with our meter is much faster and simpler than by previous methods and that non-technical personnel can easily take and record noise measurement with our meter while other methods require trained technical personnel to make such measurements.

While we have described our invention in certain preferred embodiments we realize that modifications can be made and we desire that it be understood that no limitations upon our invention are intended other than may be imposed by the scope of the appended claims.

What we claim as new and desire to secure by Letters Patent of the United States is as follows:

1. A portable battery powered noise hazard meter adapted to be carried and operated by one hand and comprising a casing of a size to permit ready carrying by one hand of an operator, a microphone frequency weighted to have a relatively flat response to approximately 1000 c.p.s. and a rising response to approximately 5000 c.p.s. mounted upon one end of the casing to be directed at a noise source, an adjustable attenuator circuit electrically connected with said frequency weighted microphone within said casing, a single movable adjusting element for the attenuator circuit mounted upon one side of the casing near and inwardly of said microphone and adapted to be manipulated by the thumb of the hand carrying said casing, a power switch mounted upon the other side of said casing near the longitudinal center of the casing to be operated by one finger of the hand carrying said casing, a transistor amplifier circuit within said casing electrically connected with the opposite end of the attenuator circuit and with said power switch, a battery within said casing to energize said circuits when the power switch is held closed, a meter disposed within said casing near the end thereof remote from the microphone and having a dial visible on the face of the casing and electrically connected with the output of the amplifier circuit, and a movable calibrated dial visible through a dial opening in the face of the casing intermediate the microphone and meter dial and near said movable adjustment element and operated by the latter, the visible indicia on said dials being directly indicative of noise hazard to human hearing.

2. A self-contained compact battery powered noise hazard meter adapted to be bodily held and manipulated in one hand and capable of visually indicating directly and without the use of external aids the hazard of noise to human hearing and comprising a somewhat elongated casing including forward and rear ends, relatively narrow side walls, and top and bottom walls, a microphone frequency weighted to have a relatively flat response to approximately 1000 c.p.s. and a rising response to approximately 5000 c.p.s. mounted upon the forward end of said casing to be directed at a noise source, a first visible dial mounted upon the top wall of said casing rearwardly of the microphone, a meter within said casing including a visible dial on the top wall of said casing rearwardly of said first visible dial, a power switch mounted upon one side wall of the casing intermediate said visible dials and adapted to be operated by one finger of the hand holding said casing, a battery check switch mounted upon said one side wall of the casing forwardly of and near said power switch and adapted to be operated simultaneously with the power switch by another finger of the hand holding said casing, a rotary adjustment element mounted upon the opposite side wall of the casing near and inwardly of the forward end of the casing and forwardly of said power switch and adapted to be manipulated by the thumb of the hand holding said casing, a battery within said casing, and circuit means within the casing electrically interconnecting said frequency weighted microphone, meter, battery, and said switches, and including an amplifier component and an adjustable attenuator network, said attenuator network being connected with said rotary adjustment element to be operated thereby, and said visible dials indicating directly the hazard of noise to human hearing.

3. A portable battery powered noise hazard meter adapted to be carried and operated by one hand comprising a directionally orientable portable case, a microphone frequency weighted to have a relatively flat response to approximately 1000 c.p.s. and a rising response to approximately 5000 c.p.s. located in the front of said case to be directed at a noise source, a transistorized amplifier within said case, a meter carried by said case and controlled by the output of said amplifier circuit, a multi-section attenuator circuit having an output and a fixed input contact for each attenuator stage interposed between said frequency weighted microphone and the input to said amplifier, the output of said attenuator circuit connected to the input of said transistorized amplifier, an attenuator adjustment element connected to the output of said microphone and movable for selective electrical contact with the fixed attenuator input contacts, a viewable calibrated attenuator dial coupled to said attenuator adjustment element and carried by the case, a battery power supply, a power switch connected in series with said battery to supply voltage to the microphone, attenuator and amplifier circuits, and said meter and said calibrated attenuator dial directly indicating the hazard of noise to human hearing when said power switch is operated.

4. A portable battery powered noise hazard meter adapted to be carried and operated by one hand comprising a directionally orientable portable case, a microphone frequency weighted to have a relatively flat response to approximately 1000 c.p.s. and a rising response to approximately 5000 c.p.s. located in the front of said case to be directed at a noise source, a transistorized amplifier within said case, a meter carried by said case and controlled by the output of said amplifier circuit, a multi-section attenuator circuit having an output and a fixed input contact for each attenuator stage interposed between said frequency weighted microphone and the input to said amplifier, the output of said attenuator circuit connected to the input of said transistorized amplifier, an attenuator adjustment element connected to the output of said microphone and movable for selective electrical contact with the fixed attenuator input contacts, a viewable calibrated attenuator dial coupled to said attenuator adjustment element and carried by the case, a battery power supply, a power switch connected in series with said battery to supply voltage to the microphone, attenuator and amplifier circuits, a battery check switch in series with said power switch, a battery check circuit extending from said battery check switch to said output meter, said meter and said calibrated attenuator dial directly indicating the hazard of noise to human hearing when said power switch is operated, and said meter indicating battery condition on the simultaneous closing of said power switch and said battery check switch.

References Cited in the file of this patent

UNITED STATES PATENTS

| | | |
|---|---|---|
| 1,862,458 | Barstow | June 7, 1932 |
| 2,097,872 | Ellis | Nov. 2, 1937 |
| 2,212,431 | Bly | Aug. 20, 1940 |
| 2,640,099 | Hull | May 26, 1953 |
| 2,671,134 | Chrystie | Mar. 2, 1954 |

FOREIGN PATENTS

| | | |
|---|---|---|
| 544,753 | Italy | June 19, 1956 |